United States Patent [19]
Nakamura

[11] 3,936,870
[45] Feb. 3, 1976

[54] AUTOMATIC GAIN CONTROL FOR COLOR TELEVISION CAMERA WITH REPRODUCED COLOR FIDELITY

[75] Inventor: Takashi Nakamura, Tokyo, Japan
[73] Assignee: Sony Corporation, Tokyo, Japan
[22] Filed: May 28, 1974
[21] Appl. No.: 474,054

[30] Foreign Application Priority Data
May 29, 1973 Japan.................. 48-60066

[52] U.S. Cl..................... 358/27; 358/29
[51] Int. Cl.²........................... H04N 9/04
[58] Field of Search............ 358/43, 27, 39, 40, 44, 358/55, 29; 178/DIG. 29

[56] References Cited
UNITED STATES PATENTS

| | | | |
|---|---|---|---|
| 3,699,241 | 10/1972 | Larsen................... | 358/43 |
| 3,719,771 | 3/1973 | Eto et al.................. | 358/55 X |
| 3,737,561 | 6/1973 | Boer........................ | 358/27 |
| 3,784,740 | 1/1974 | Copland.................. | 178/DIG. 29 |
| 3,821,789 | 6/1974 | Durbin, Jr. et al...... | 358/27 |

*Primary Examiner*—Albert J. Mayer
*Assistant Examiner*—Mitchell Saffian
*Attorney, Agent, or Firm*—Lewis H. Eslinger; Alvin Sinderbrand

[57] ABSTRACT

A color television camera is disclosed in which level detector circuits are supplied with a plurality of color signals; a control signal, produced by the level detectors when any one of the color signals exceeds a predetermined level, is applied to an automatic gain control circuit connected in a transmission path for a picked up output; and the automatic gain control circuit is supplied with a control signal based upon a luminance signal when the former-mentioned control signal is not obtained.

7 Claims, 4 Drawing Figures

AUTOMATIC GAIN CONTROL FOR COLOR TELEVISION CAMERA WITH REPRODUCED COLOR FIDELITY

BACKGROUND OF THE INVENTION

1. Field of the Invention

This invention relates generally to a color television camera and is more particularly directed to a color television camera with an improved automatic gain control (AGC) system.

2. Description of the Prior Art

In the art there has been proposed a color television camera using one image pickup tube in which an AGC system is provided to produce a video signal with a constant level even if the amount or intensity of incident light to the camera is changed.

By way of example, with one of the prior art systems, the bias voltage for the target of its image pickup tube is changed in accordance with the level of a produced luminance signal to make an output voltage from the image pickup tube constant.

With another one of the prior art systems, the target voltage of its image pickup tube is made constant and an AGC circuit is provided at the output side of the image pickup tube which is controlled in accordance with the level of a produced luminance signal.

Accordingly to the prior art systems, the level of a luminance signal contained in the camera output is held substantially constant regardless of the amount or intensity of incident light. However, since in the prior art the AGC system operates for both of luminance and chrominance signals, if an object of, for example, red color is photographed by the camera in a dark place, the luminance signal is increased to a predetermined level by the AGC system, but the level of a red color signal is also increased. Thus, a video signal in which a red color is emphasized excessively is produced. As a result, an unnatural picture is reproduced.

SUMMARY OF THE INVENTION

It is an object of this invention to provide a color television camera having provided with an AGC system which can control not only the level of a luminance signal but also the level of a color signal.

It is another object of this invention to provide a color television camera with a system which controls the target voltage of an image pickup tube in accordance with both levels of luminance and color signals.

It is a further object of this invention to provide a color television camera with an AGC circuit the gain of which is controlled in accordance with both levels of luminance and color signals.

The additional and other objects, features and advantages of this invention will be apparent from the following description taken in conjunction with the accompanying drawings.

BRIEF DESCRIPTION OF THE DRAWINGS

Throughout the drawings, like reference numerals and symbols represent the like elements.

DESCRIPTION OF THE PREFERRED EMBODIMENTS

An embodiment of this invention will be hereinbelow described with reference to the drawings.

Figure 1:
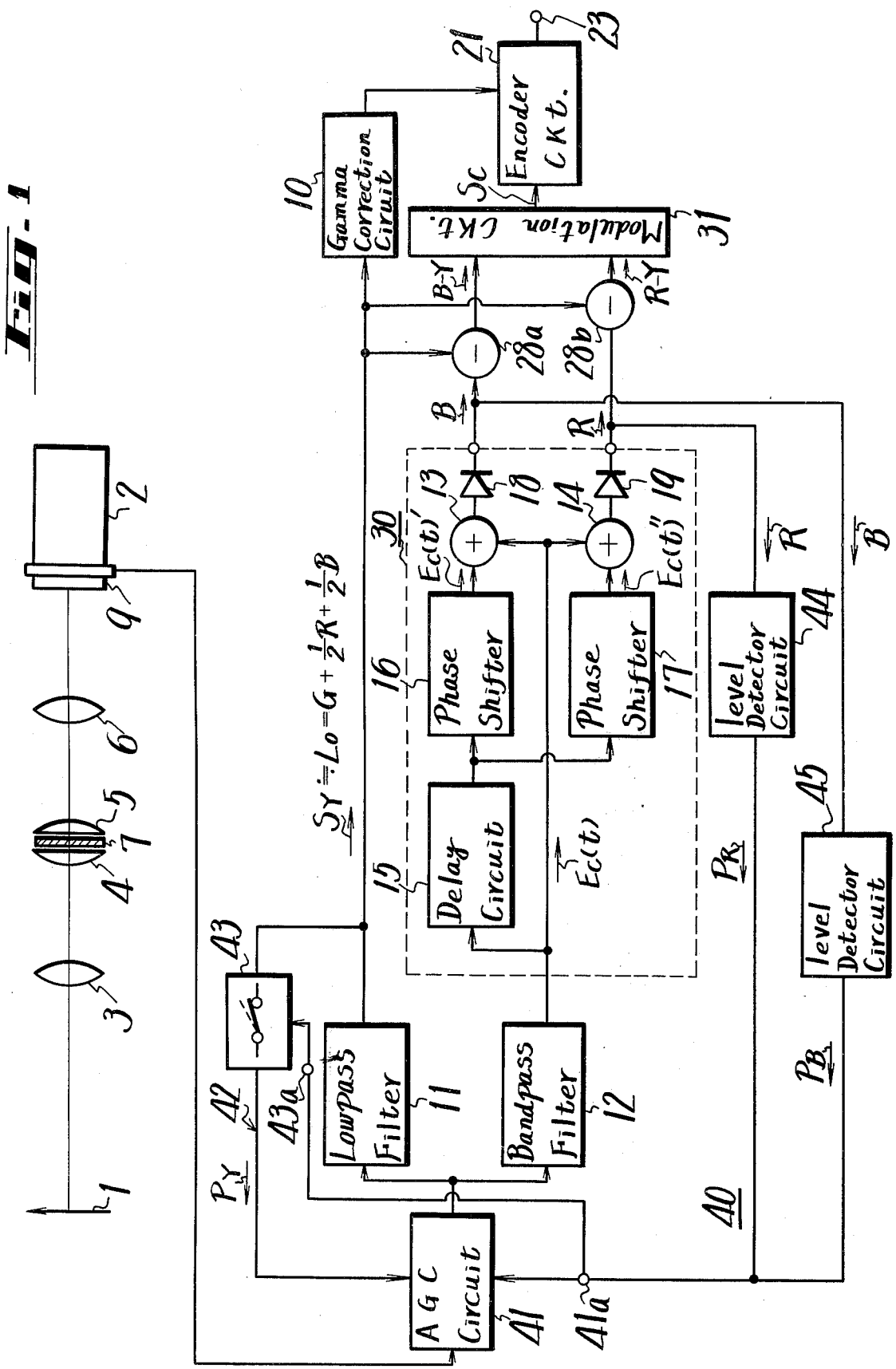
FIG. 1 is a schematic diagram showing an embodiment of the color television camera according to this invention.

In FIG. 1 which shows an embodiment of the invention systematically, reference numeral 1 designates an object to be televised and 2 an image pickup tube. On the light path between the object 1 and the image pickup tube 2, there are arranged an image pickup lens 3, field lenses 4 and 5, and a relay lens 6, respectively, and also a color filter 7 between the field lenses 4 and 5 or on the focus plane of the pickup lens 3.

Figure 2:
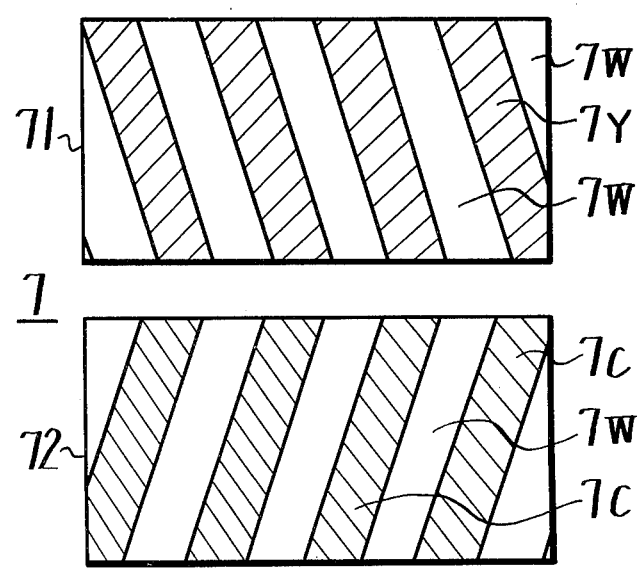
FIG. 2 is an exploded front view showing an embodiment of the color filter used in the camera shown in FIG. 1.

An example of the color filter 7 is shown in FIG. 2, by way of example. As shown in FIG. 2, the color filter 7 consists of a pair of color striped filters 71 and 72. One color striped filter 71 includes a plurality of striped transparent regions or elements $7_W$ which may pass therethrough panchromatic light and a plurality of yellow striped filter regions or elements $7_Y$ which may pass therethrough yellow light. In this case, these regions $7_W$ and $7_Y$ are arranged repeatedly and alternately with an inclination angle (which will be described later) with respect to the horizontal scanning line. The other color striped filter 72 includes a plurality of striped transparent regions or elements $7_W$ and a plurality of striped cyan striped filter regions or elements $7_C$ which may pass therethrough cyan light. In this case, these regions $7_W$ and $7_C$ are arranged repeatedly and alternately with an inclination angle to the horizontal scanning line opposite to the former inclination angle, or the arranging directions of the both filter regions are symmetrical with respect to the horizonal line between the filters 71 and 72 as shown in FIG. 2. In this case, the arranging pitch of the regions $7_W$ and $7_C$ is same as that of the regions $7_W$ and $7_Y$. The color filter 7, which is formed by superimposing the color striped filters 71 and 72, is placed between the field lenses 4 and 5 as mentioned above.

Thus, the color light components contained in the light from the object 1 are subjected to the special modulation by the color filter 7 with the result that color separated images of checkered pattern with panchromatic light, red light and blue light are projected onto a photoelectric conversion plane 9 of the image pickup tube 2.

Figure 3:
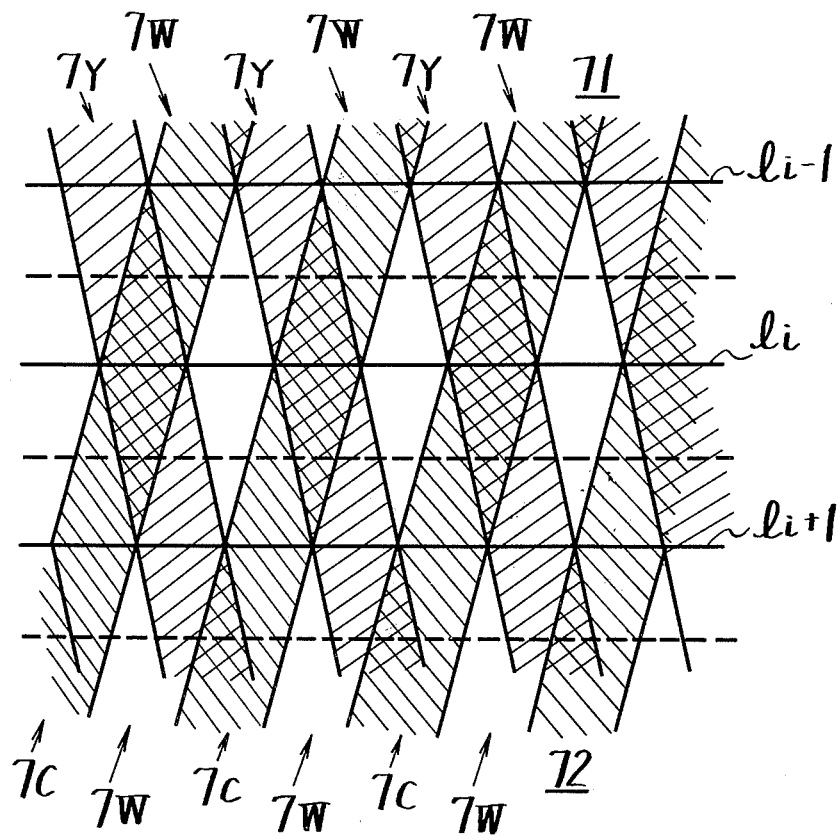
FIG. 3 is a color separated imaged by the color filter shown in FIG. 2.

The inclination angle of the color striped filter 71 to the horizontal scanning line is selected in the following manner. That is, the repeating of the filter regions $7_W$ and $7_Y$ is shifted by $\pi/2$ at every horizontal scanning line or, as shown in FIG. 3, when the color separated image corresponding to the filter 71 is scanned at one of odd and even fields, the output from the image pickup tube 2 corresponding to an arbitrary scanning line $l_i$ is advanced (or delayed) by $\pi/2$ from the output from the image pickup tube 2 corresponding to the following scanning line $l_{i+1}$. As mentioned above, the inclination angle of the regions $7_W$ and $7_C$ of the filter 72 is symmetrical for that of the filter 71, so that when the color separated image corresponding to the filter 72 is scanned, the output from the image pickup tube 2 corresponding to the scanning line $l_{i+1}$ is advanced (or delay) by $\pi/2$ from that corresponding to the scanning line $l_i$.

The output signal from the image pickup tube 2 or signal $E(t)$, which is produced by scanning the color separated signals through the filters 71 and 72, is applied to a low-pass filter 11 and a band-pass filter 12, respectively through an AGC circuit 41 which will be described later. From the low-pass filter 11 there is derived a low frequency signal $L_O$. Since the low frequency signal $L_O$ can be considered as a luminance signal, this signal will be used as the luminance signal $S_Y$ in the following description. The luminance signal $S_Y$ is applied to a gamma correction circuit 10 for the luminance signal $S_Y$. While, from the band-pass filter 12 there is derived a modulated color signal or chrominance signal $E_C(t)$ which is supplied to adding circuits 13 and 14 forming a demodulation circuit 30, and also to a delay circuit 15 to be delayed by one horizontal period. The delayed output signal from the delay circuit 15 is applied to phase shifter circuits 16 and 17 to be shifted in phase by $\pi/2$ and $-\pi/2$, respectively. The phase shifted signals $E_C(t)'$ and $E_C(t)''$ are supplied to the adding circuits 13 and 14, respectively, where they are added to the signal $E_C(t)$. The output signals from the adding circuits 13 and 14 are applied to detector circuits 18 and 19, respectively, which produce blue and red color signals B and R by demodulation. The color signals B and R are supplied to subtracting circuits 28a and 28b, respectively, to be color difference signals B-Y and R-Y which are applied to a modulation circuit 31 supplied with a color sub-carrier signal with the frequency of 3.58MHz. The modulation circuit 31 produces a chrominance signal $S_C$. The chrominance signal $S_C$ and the luminance signal $S_Y$ through the gamma correction circuit 10 are applied to an color encoder circuit 21 where they are converted to the color television signal of, for example, the NTSC system and delivered to an output terminal 23.

The luminance signal $S_Y$, which is contained in the color television signal for the NTSC system obtained at the terminal 23 as a final signal of the color television camera, is expressed as follows:

$S_Y = 0.3S_R + 0.59S_G + 0.11S_B$ where $S_R$, $S_G$ and $S_B$ represent red, green and blue color signals, respectively. Accordingly, when the luminance signal $S_Y$ is of a predetermined value 1, primary color signals $S_R$, $S_G$ and $S_B$ become all 1. Since the maximum level of the luminance signal $S_Y$ is 1, the level of the respective color signals must be, of course, 1 or less than 1. However, according to the prior art AGC system, since an output signal is controlled with a detecting signal of the luminance signal $S_Y$ which is made to be 1 in maximum level, the following defects occur during the picking up of an object. That is, if the object has a white portion, there exist red (R), green (G) and blue (B) color components. As a result, no problem may occur when such an AGC operation is carried out to make the luminance signal $S_Y$ 1. However, when an object which has, for example, a red color portion of low luminance thereon is photographed, the AGC circuit performs its operation to increase the luminance due to the low luminance. As a result, when the luminance signal $S_Y$ is made 1 in level by gain controlling, the level of the red color signal is also increased by that controlled amount with the result that the total level exceeds 1. Accordingly, if such a condition is monitored, due to the fact that the output signal corresponding to the red color signal is great, a picture can not be reproduced with high fidelity. The same is also applied to the blue color signal B.

With this invention, as shown in FIG. 1, the AGC circuit 41 is provided at the pre-stage of the filter circuits 11 and 12 which separate the luminance signal $S_Y$ and the chrominance signal $E_C(t)$ from the picked up output by the image pickup tube 2. The AGC circuit 41 is supplied the luminance signal $S_Y$ obtained by the filter circuit 11 as a first control signal $P_Y$ through a feedback loop 42 which includes an electronic switch circuit 43. The electronic switch circuit 43 is controlled to be made off (or open) when any one of the red and blue color signals exceeds 1 in level, which will be described later. That is, when any one of the red and blue color signals is lower than 1 in level, the switch circuit 43 is made on (or close) as shown by a solid line in FIG. 1.

In the embodiment of the invention shown in FIG. 1, level detector circuits 44 and 45 are provided which are supplied with the red and blue color signals R and B from the detector circuits 19 and 18, respectively, for detecting their levels and apply their output signals to the AGC circuit 41 as second and third control signals $P_R$ and $P_B$ through an input terminal 41a of the AGC circuit 41. The control signals $P_B$ and $P_R$ are also applied to the electronic switch circuit 43 as its control signals through its input terminal 43a in addition to the input terminal 41a. The AGC circuit 41, the electronic switch circuit 43 and the level detector circuits 44 and 45 from an AGC circuit 40.

Though not shown in detail, the level detector circuits 44 and 45 may be formed of, for example, a well known clamp circuit and a diode, respectively. Only when the level of the blue color signal B applied to the level detector circuit 45 exceeds 1, the detector circuit 45 produces the third control signal $P_B$ which is applied to the switch circuit 43 and to the AGC circuit 41 to make the former off and to drive the latter, respectively. The other level detector circuit 44 operates similarly.

The description will be now given on the operation of the AGC control circuit 40 constructed as above. When the level of the color signals R and B are lower than 1, the second and third control signals $P_R$ and $P_B$ are not obtained. Therefore, the switch circuit 43 is closed (on). Thus, in this case the AGC circuit 41 is controlled by the first control signal $P_Y$, so that the level of the luminance signal $S_Y$ is adjusted to be 1. Next, when the object 1 has the only color component of red with low luminance, since the AGC is achieved by the first control signal $P_Y$, the level of the red color signal R is intended to be more than 1. However, when the level exceeds 1, the level detector circuit 44 produces the second control signal $P_R$ with the result that the switch circuit 43 is controlled to cut off the first control signal $P_Y$. At the same time, since the second control signal $P_R$ is applied to the AGC circuit 41, the AGC is performed by the second control signal $P_R$ to operate such that the level of the red color signal R is kept 1 or lower than 1 instead of the luminance signal $S_Y$. As a result, the red color signal R is controlled to be 1 or lower than 1 in level to reproduce a picture with high fidelity.

When only the blue color signal B exceeds 1 in level, the AGC operation is performed based upon the third control signal $P_B$ to control the level to be 1 or a reference level lower than 1 with the result that the same effect can be carried out.

When no second and third control signals $P_R$ and $P_B$ are produced, it is of course that the system returns to its original state to effect the AGC operation with the first control signal $P_Y$. As mentioned above, when the level of any one of the color signals R and B exceeds the reference level, the level detector circuit 44 or 45 starts its operation at once to suppress the level.

As described above, with this invention the increase in level of the color signals R and B can be suppressed by simple construction even if the object 1 to be televised is different in color components, so that the chrominance signals are prevented from being increased excessively to always produce a good color television signal and to reproduce a picture with high fidelity.

Figure 4:
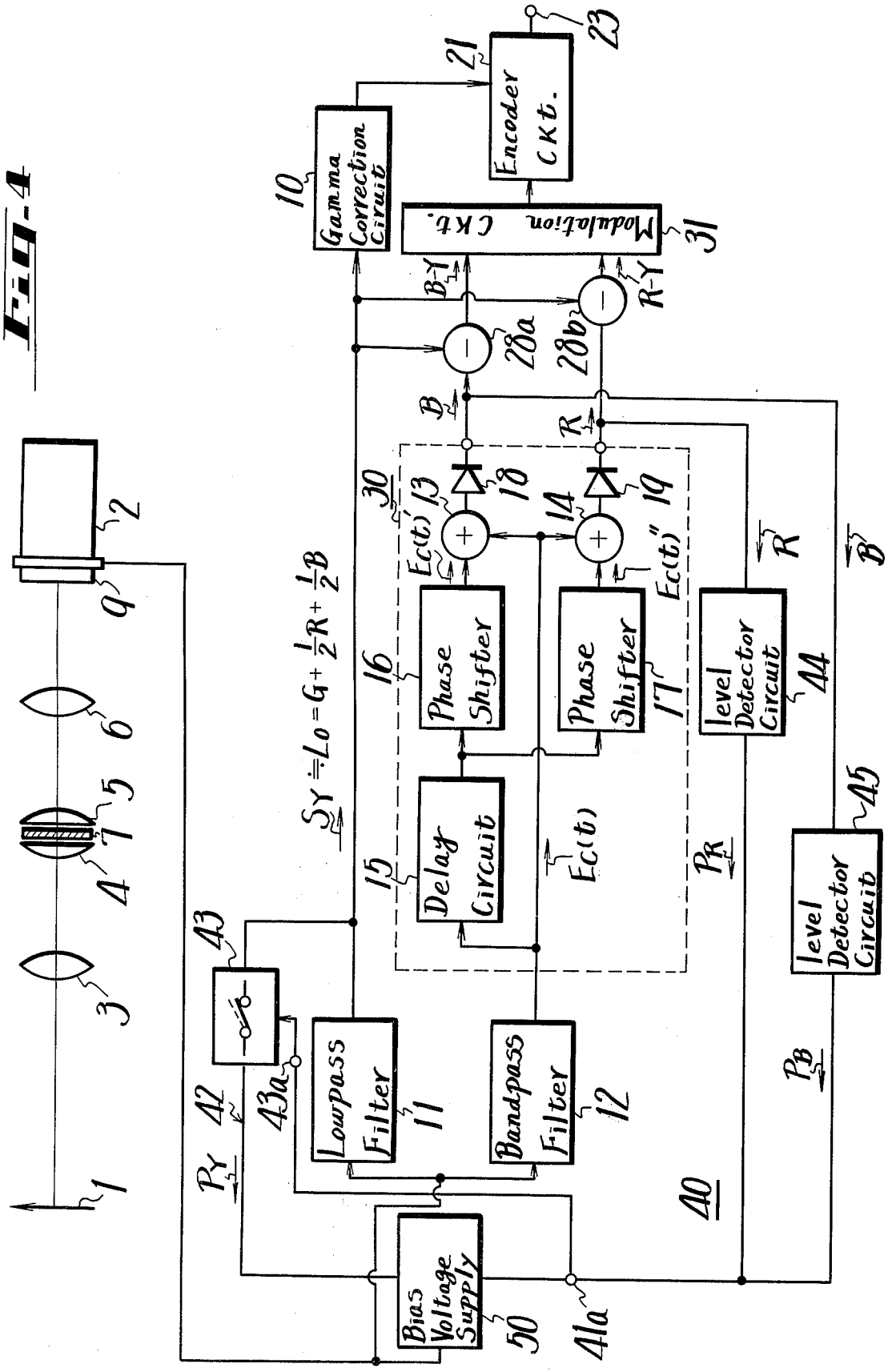
FIG. 4 is a schematic diagram showing another embodiment of the color television camera according to this invention.

The above embodiment shows the case that the target voltage of the image pickup tube 2 is made constant, but in the embodiment of FIG. 4 the target voltage of the image pickup tube 2 is changed in accordance with the level of the luminance signal $S_Y$.

This case or a second embodiment of this invention will be now described with reference to FIG. 4 in which reference numerals same as those used in FIG. 1 show the same elements. In the embodiment of FIG. 4, the output signal from the image pickup tube 2 is directly applied to the filters 11 and 12, respectively. A bias voltage supply circuit 50 is provided which is controlled by the first, second and third control signals $P_Y$, $P_R$ and $P_B$, respectively, as in the case of the AGC circuit used in FIG. 1. The bias voltage supply circuit 50 is formed such that it produces a relatively high bias voltage when the luminance signal is low in level, but produces a relatively low bias voltage when the luminance signal is high in level and that when the second and third control signals $P_R$ and/or $P_B$ are larger than a predetermined value, the first control signal $P_Y$ is cut off, so that the similar operation is carried out in the embodiment of FIG. 4.

In the above embodiments, this invention is applied to a color television camera utilizing one image pickup tube in which the luminance signal $S_Y$ and two primary color signals R and B are derived from the filter circuits 11 and 12, respectively, but it may be apparent that this invention can be applied to a color television camera utilizing multi-image pickup tubes in which three primary color signals R, G and B are produced. In such a case, a level detector circuit, which may detect the level of the green color signal G, is provided in addition to the detector circuits 44 and 45, and a fourth control signal obtained from the detector circuit for the green color signal G is applied to the AGC circuit 41 for achieving the same effect.

It may be apparent that many modifications and variations could be effected by those skilled in the art without departing from the spirits and scope of the novel concepts of this invention.

I claim as my invention:

1. Color television camera apparatus, comprising an image pickup tube; color filter means for forming color separated images of a viewed object on said image pickup tube; means for deriving a composite color video signal from said image pickup tube representative of said color separated images, said composite signal including a luminance signal and a chrominance signal, the latter being comprised of plural color components; means for separating said composite color video signal into said luminance and chrominance signals, respectively; level control means for controlling the magnitude of said composite color video signal in response to said luminance signal when none of said color components of said chrominance signal exceeds a predetermined level; and means for controlling said level control means with a different signal when a color component of said chrominance signal exceeds said predetermined level.

2. Color television camera apparatus as claimed in claim 1, in which said color filter means comprises a first set of striped color filters and a second set of striped color filters, the first and second set intersecting with each other.

3. Color television camera apparatus as claimed in claim 1 wherein said level control means includes a control input, and further comprising switch means coupled to said control input for selectively supplying said separated luminance signal thereto.

4. Color television camera apparatus as claimed in Claim 3 further comprising detecting means for detecting when a color component of said chrominance signal exceeds said predetermined level to operate said switch means to thereby prevent said separated luminance signal from being supplied to said level control means.

5. Color television camera apparatus as claimed in Claim 4 wherein said detecting means comprises a plurality of level detectors for detecting the levels of said color components, respectively; and further comprising means for supplying the output of a level detector to said control input of said level control means for controlling said level control means when the level of said color component detected by said level detector exceeds said predetermined level.

6. Color television camera apparatus as claimed in claim 5, in which said level control means is a circuit which controls a target voltage of said image pickup tube.

7. Color television camera apparatus as claimed in Claim 5 wherein said level control means comprises an automatic gain control circuit.

* * * * *